United States Patent [19]
Hoshino

[11] Patent Number: 5,894,652
[45] Date of Patent: Apr. 20, 1999

[54] OPPOSED WIPING TYPE WIPER UNIT

[75] Inventor: Takashi Hoshino, Isesaki, Japan

[73] Assignee: Mitsuba Corporation, Kiryu, Japan

[21] Appl. No.: 08/678,610

[22] Filed: Jul. 15, 1996

Related U.S. Application Data

[63] Continuation-in-part of application No. 08/246,410, May 20, 1994, abandoned.

[30] Foreign Application Priority Data

Jun. 30, 1993 [JP] Japan .................. U.M. 041182

[51] Int. Cl.[6] ...................... B60S 1/06; B60S 1/24
[52] U.S. Cl. .............. 29/401.1; 15/250.14; 15/250.3; 15/250.31; 15/250.27; 74/43
[58] Field of Search ................ 15/250.14, 250.3, 15/250.13, 250.27, 250.31, 250.16; 74/42, 43, 51, 4; 134/6, 42; 29/401.1, 897.2; 296/96.17, 96.15

[56] References Cited

U.S. PATENT DOCUMENTS

| | | | |
|---|---|---|---|
| 2,298,197 | 10/1942 | Coffey | 15/250.27 |
| 3,113,334 | 12/1963 | Howard | 15/250.14 |
| 3,336,619 | 8/1967 | Hoyler | 15/250.14 |

FOREIGN PATENT DOCUMENTS

| | | | |
|---|---|---|---|
| 1169209 | 6/1984 | Canada | 15/250.3 |
| 2555531 | 5/1985 | France | |
| 1580743 | 7/1970 | Germany | 15/250.27 |
| 36 44 428 | 7/1988 | Germany | |
| 30 860 | 2/1989 | Japan | 15/250.14 |
| 2028114 | 3/1980 | United Kingdom | |

*Primary Examiner*—Gary K. Graham
*Attorney, Agent, or Firm*—Oliff & Berridge, PLC.

[57] ABSTRACT

An opposed wiping type wiper unit for use with one of right-hand and left-hand specifications has a crank arm that rotates when driven by a motor, an intermediate link connected to right-hand and left-hand wiper shafts through driving rods, and a connecting rod that connects the crank arm and the intermediate link. The length of the connecting rod and the connecting position thereof to the intermediate link are set so that the actual angular acceleration change of the intermediate link is substantially symmetrical. The angular velocity changes of right-hand and left-hand wiper arms are made asymmetrical on the basis of the length of the driving rods and the connecting positions thereof to the intermediate link. Only the lengths of the driving rods and their connecting positions to the intermediate link need to be varied. Thus, the opposed wiping type wiper unit can easily be designed in accordance with both right-hand and left-hand specifications, and permits the use of as many parts common to the specifications as possible, thereby decreasing the cost.

1 Claim, 10 Drawing Sheets

OPPOSED WIPING TYPE WIPER UNIT

This is a Continuation-in-Part of application Ser. No. 08/246,410, filed May 20, 1994 now abandoned.

BACKGROUND OF THE INVENTION

1. Field of the Invention

The present invention relates to an opposed wiping type wiper unit for wiping a window of an automobile or the like.

2. Description of Related Art

An opposed wiping type wiper unit generally comprises a crank arm that rotates when driven by a motor, an intermediate link pivotally supported by an intermediate link fulcrum, and a connecting rod interposed between the crank arm and the intermediate link so as to convert the rotation of the crank arm into reciprocating oscillation of the intermediate link. In addition, the upper and lower ends of the intermediate link are respectively connected to driving levers of right-hand and left-hand wiper shafts through driving rods so as to cause opposed wiping operations of right-hand and left-hand wiper arms. Further, the angular velocity changes of the right-hand and left-hand wiper arms are set to be asymmetrical so that the wiper blades of the right-hand and left-hand wiper arms are superposed at a lower reversal position. Namely, in the vicinity of the lower reversal position, the angular velocity of the upper wiper arm (on the driver side) is set to be higher, and the angular velocity of the lower wiper arm (on the passenger side) is set to be lower so that the right-hand and left-hand wiper blades are superposed without interference therebetween.

Previously, when the angular velocity changes of the right-hand and left-hand wiper arms were set to be asymmetrical, however, all factors of angular velocity changes, such as the length of the connecting rod, the connecting position of the connecting rod to the intermediate link, the length of the driving rods, the connecting positions of the driving rods to the intermediate link, etc. were variably set. For example, all of these dimensions had to be changed when the vehicle has the driver position on the left-hand side instead of on the right-hand side. This not only complicates setting but also causes the need to design wiper units according to different setting specifications for different vehicle types and driver positions (i.e., right-hand and left-hand specifications). As a result, the parts to be used are changed in accordance with the specifications, and the number of part types is significantly increased, thereby increasing the cost.

Figure 11:
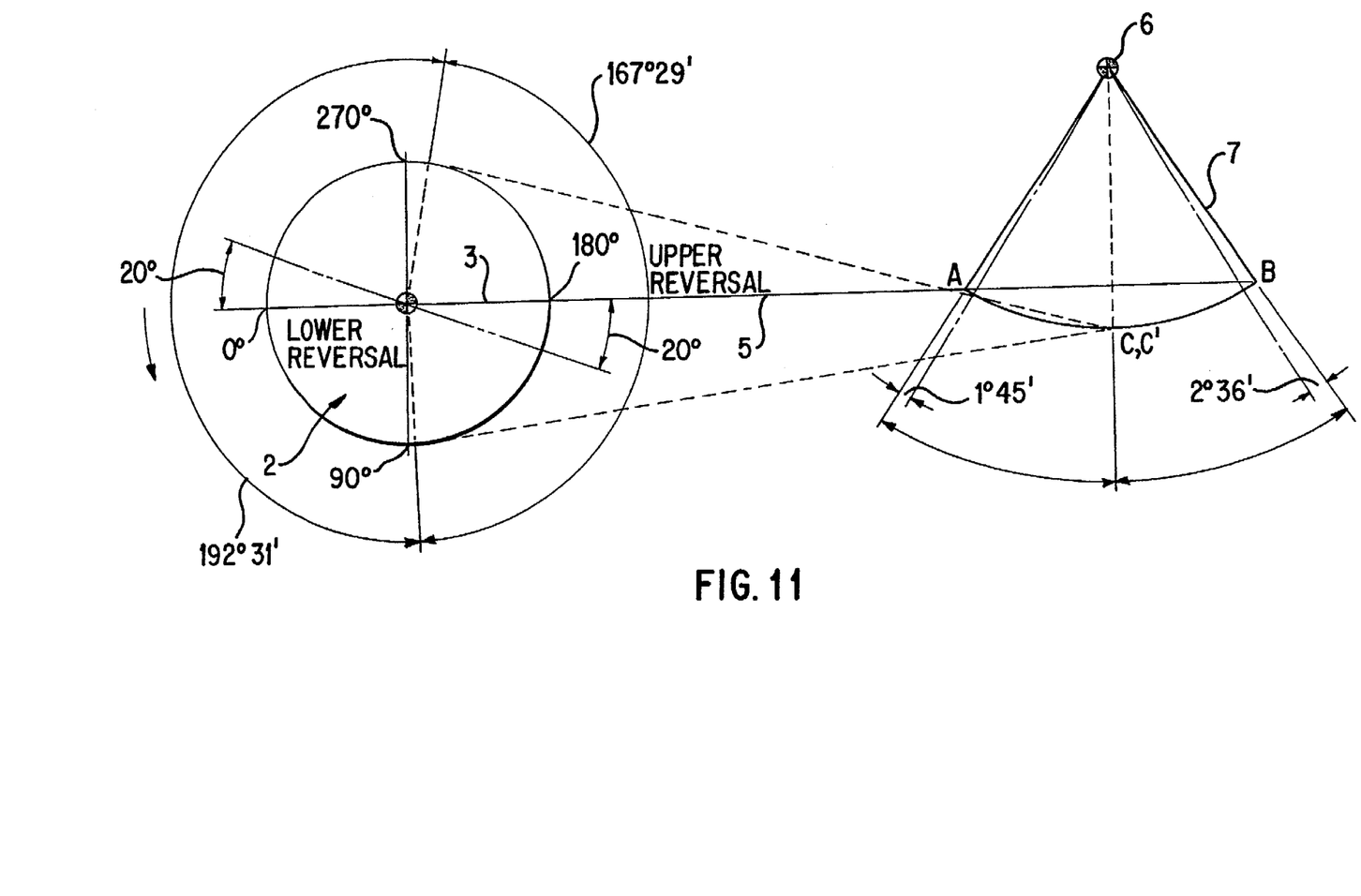
FIG. 11 is a drawing illustrating the operation of a conventional example (a general wiper unit employing uniform distribution setting).

As shown in FIG. 11, when a crank arm 3 and a connecting rod 5 are on a line at both the lower and upper reversal positions, and when both reversal positions A and B are set (uniform distribution setting) to be on this line, the intermediate position C of the crank arm 3 in the forward wiping motion of the wiper and the intermediate position C' in the backward wiping motion are not at symmetrical opposite positions at 180", but are slightly shifted from the symmetrical positions (at a calculated angle of 167.29') from the geometrical viewpoint of conversion from rotation into oscillation as shown in FIG. 11. For the same reason, the oscillation angle of the driving lever 7 at a position before the reversal (upper reversal) position where the crank arm 3 rotates for 200 in the forward motion is slightly different (a calculated value of 0.91°) from the oscillation angle in the backward motion.

Actual changes in the angular acceleration are described below with reference to FIG. 9 (an embodiment of the present invention employing uniform distribution setting for comparison). The changes in the operating angle show a sine wave with a maximum at the upper reversal position, and the changes in the angular velocity also show a sine wave form that is point-symmetrical about the upper reversal position. On the other hand, the changes in the angular acceleration in the forward and backward wiping motions of the wipers are not symmetrical for the above reason and due to the stress of the pushing and drawing motion of the connecting rod on the driving lever. The angular acceleration becomes maximum immediately before the upper reversal position and lower reversal position, and the absolute values of both maximum angular accelerations are different.

The velocities of the forward and backward wiping movements of the wipers are thus different from each other. Particularly, in an opposed wiping type wiper unit in which right and left wiper arms are superposed at the center, setting is complicated for the above reasons, and it is difficult to calculate an ideal wiping pattern and produce e wiper unit.

In summary, the setting of a conventional opposed wiping type wiper unit must be strictly balanced in order for the right and left side wiper arms to move without interfering each other when they reach the housing position. In the uniform distribution setting shown in FIG. 9, the maximum angular acceleration changes are properly set to be 0.6 rad/s$^2$ slightly before the housing position, i.e., 360°. If the same motor is used, i.e., a rotating direction is in the same direction, for both a right and left hand specification car, a 180° phase difference must be implemented because the moving direction of the wiper arms for the right hand specification is opposite to that of the left hand specification. Namely if a wiper unit is used for the reverse hand specification, the housing position of the wiper arms corresponds to 180° of FIG. 9 of which minimum angular acceleration changes are −0.9 rad/s$^2$. An absolute value difference of 0.3 rad/s$^2$ is created, which causes an imbalance such that the right and left hand wiper blades interfere each other.

Figure 9:
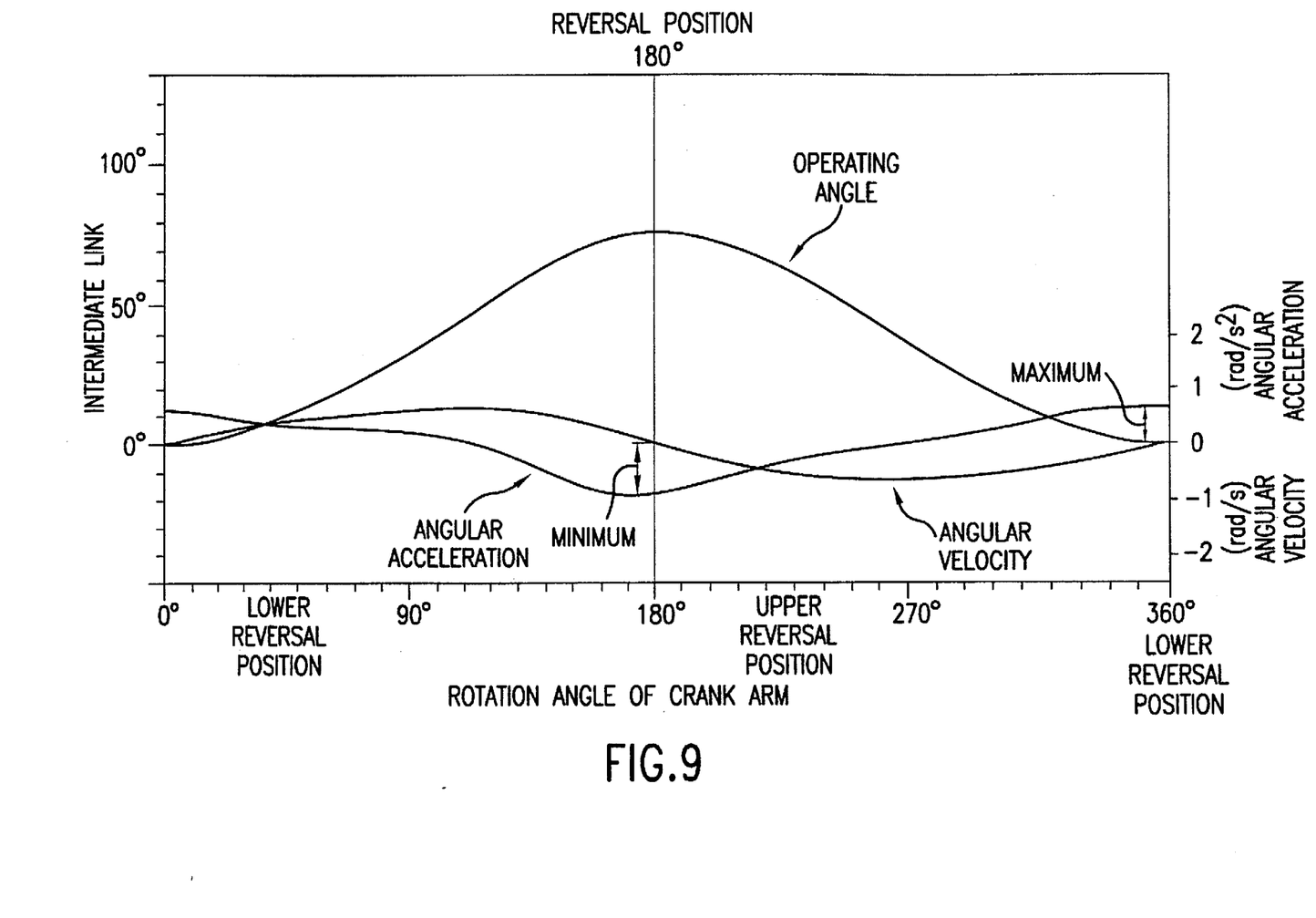
FIG. 9 is a graph showing the operating angle, angular velocity and angular acceleration of an intermediate link in a conventional example (uniform distribution setting)

Thus, theoretically, with the uniform distribution setting, the same wiper motor cannot be used commonly for both the right hand specification and the left hand specification because all components, including the wiper motor, must be produced reflecting the symmetrical relationship based upon 0° in FIG. 9 in accordance with the difference between right and left hand specifications. Therefore, components for the right hand specification are symmetrically different from components for the left hand specification, however, the same dimensional setting is applied to both specifications. On the other hand, if a motor with the same rotating direction is used for both specifications, e.g., as is common in actual production, the size of the components of the motor is set to be different for the right hand specification as opposed to the left hand specification.

SUMMARY OF THE INVENTION

The present invention has been achieved in consideration of the above-described actual situation, and an object of the present invention is to provide an opposed wiping type wiper unit which has none of the above problems.

Figure 4:
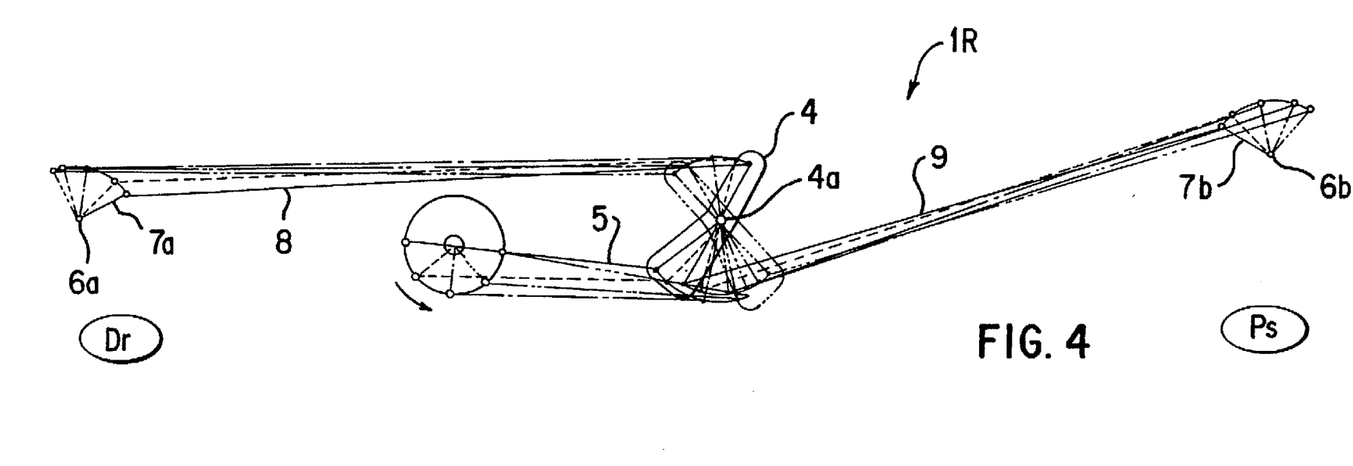
FIG. 4 is a drawing illustrating the operation of the wiper unit in accordance with right-hand specifications.
Figure 5:
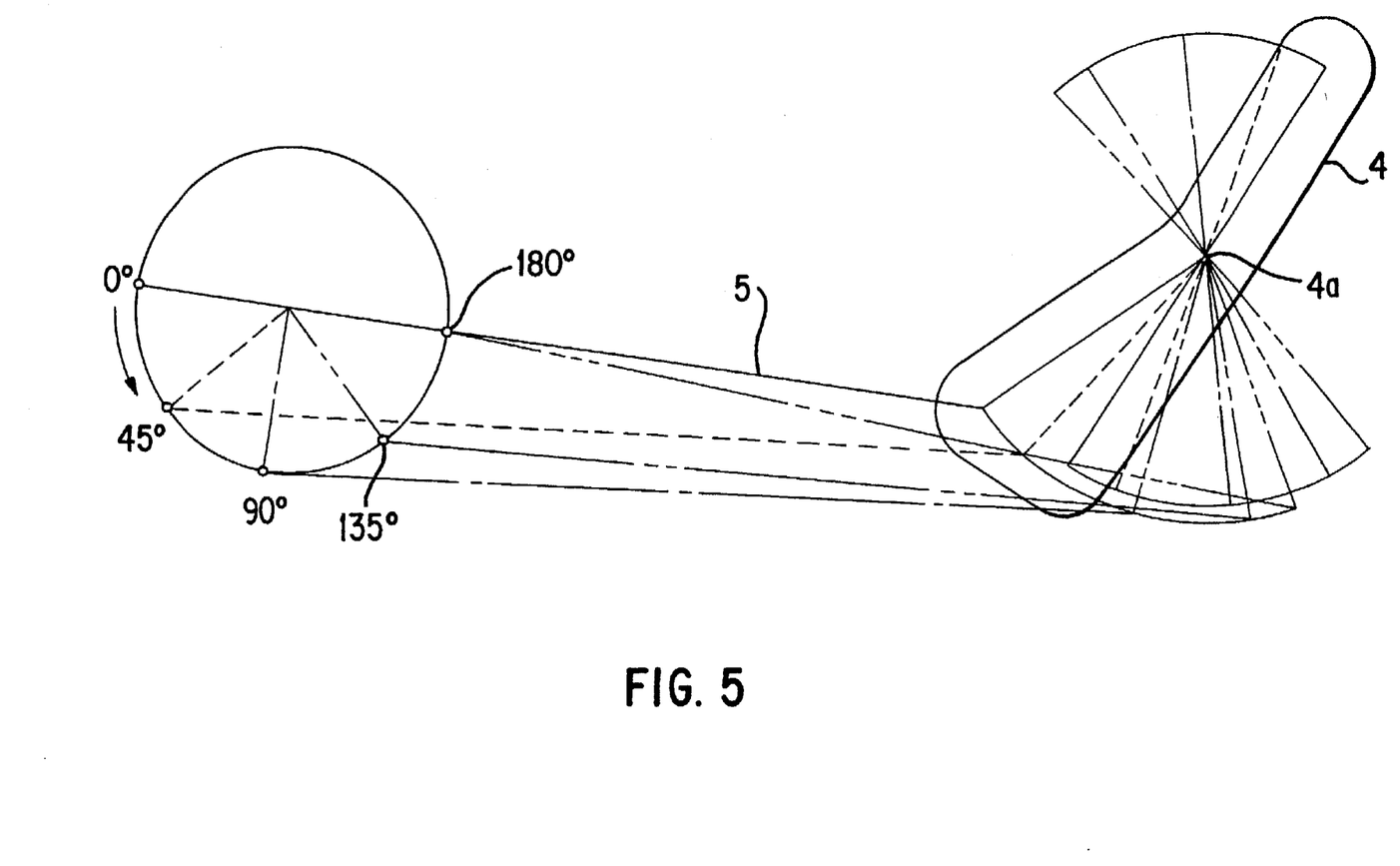
FIG. 5 is an enlarged view illustrating the principal portion of the wiper unit in accordance with right-hand specifications.
Figure 6:
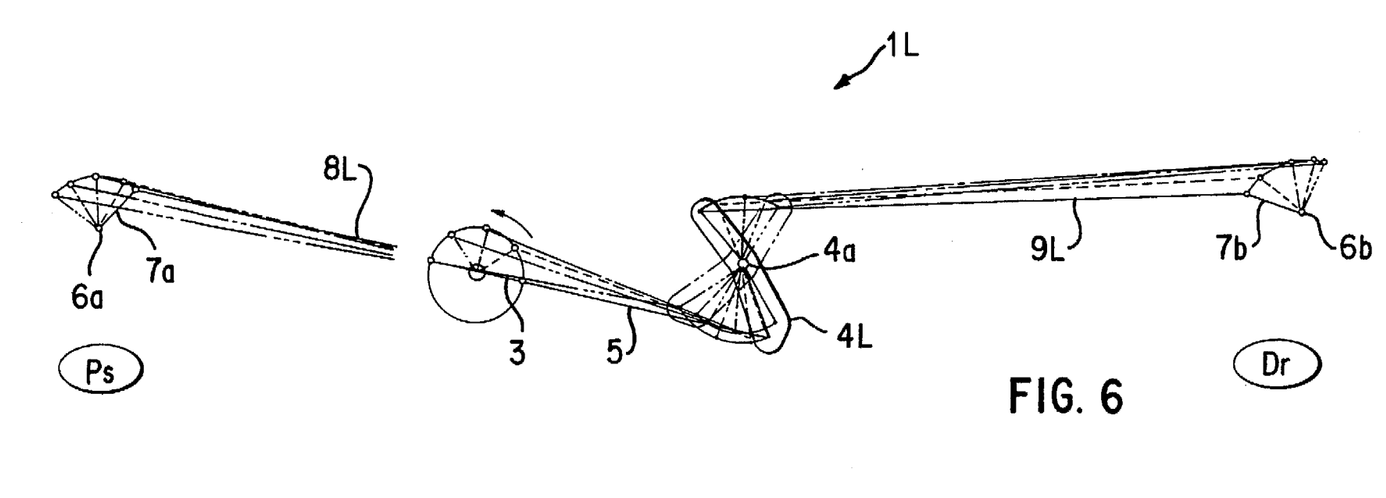
FIG. 6 is a drawing illustrating the operation of the wiper unit in accordance with left-hand specifications.
Figure 7:
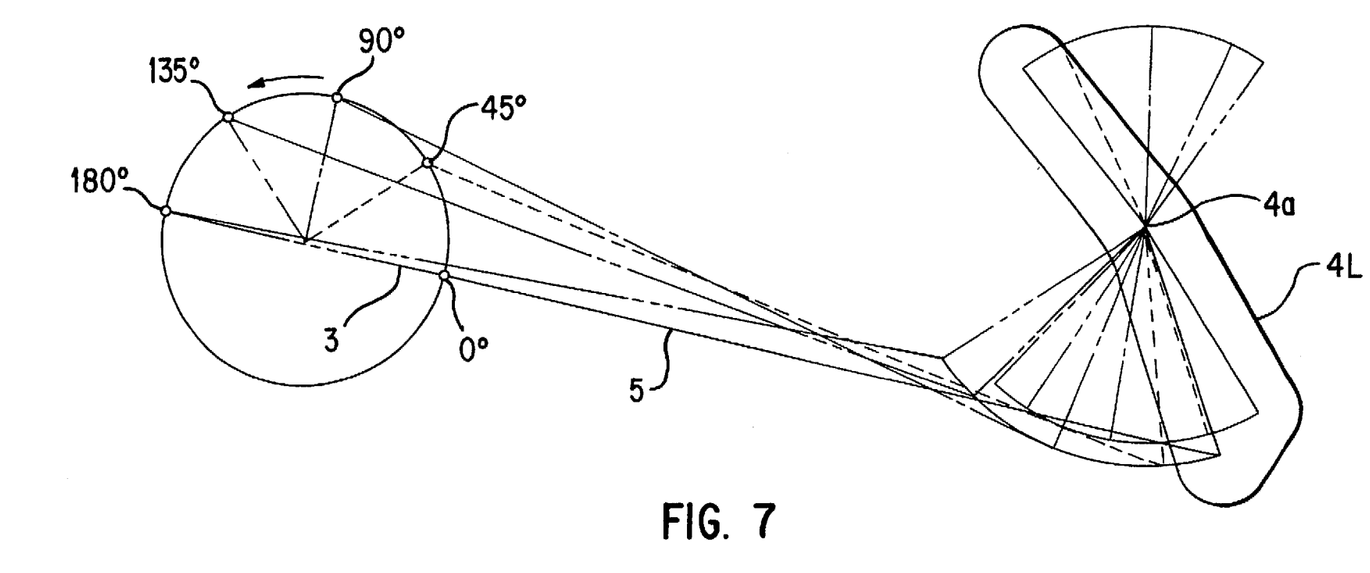
FIG. 7 is an enlarged view illustrating the principal portion of the wiper unit in accordance with left-hand specifications.

In order to solve the problems mentioned above, the moving balance of right and left hand side wiper arms, slightly before the housing positions, are set to be the same for both right and left hand specifications. FIG. 4 shows angular acceleration changes for a right hand specification. FIG. 6 shows angular acceleration changes for a left hand specification. The housing positions 0° (360°) in FIG. 4 correspond to the reversal positions in FIG. 6, which are set to be the phase difference 180°. The reversal position, 180° in FIG. 4 corresponds to the housing position in FIG. 6. Wiper arms for right and left hand specifications do not interfere each other by taking the same moving balance while they are reaching the housing position if the relationship of angular acceleration changes slightly before the housing position is set to be the same for both specifications.

Figure 8:
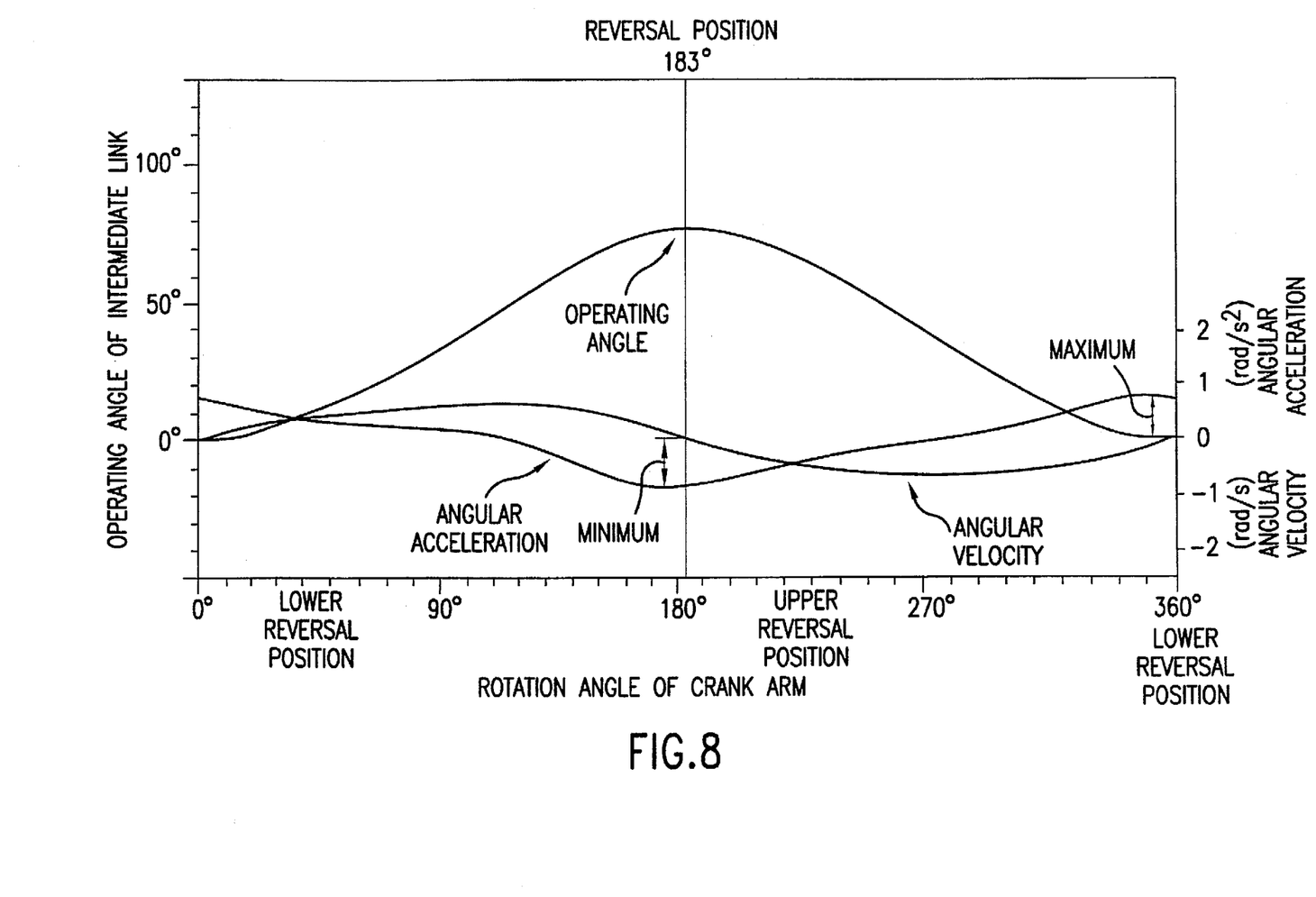
FIG. 8 is a graph showing the operating angle, angular velocity and angular acceleration of an intermediate link according to the present invention (uniform setting of angular acceleration)

Therefore, as shown in FIG. 8, Applicant's invention sets the angular acceleration changes to be approximately 0.85 rad/s$^2$ slightly before 180° position, and approximately 0.80 rad/s$^2$ slightly before 360° position. Thus, the angular acceleration changes are substantially equal. This relationship enables the same motor, i.e., the rotating direction is the same, to be utilized commonly for both right and left hand specifications.

The maximum angular acceleration changes in the housing positions for the right hand specification is set to be plus, while the minimum angular acceleration changes in the housing position for the left hand specification is set to be minus. This is required because the moving directions of the wiper arms for the right hand specification are opposite to that of left hand specification.

In summary, if in the conventional uniform distribution setting the angular acceleration changes slightly before both the reversal position and the housing position could be theoretically 0.6 rad/s in absolute value, then common components could be utilized for both right and left hand specifications. But actually the angular acceleration changes slightly before the reversal position is 0.9 rad/s and as a result as much as 0.3 rad/s in absolute value, the difference comparing with the angular acceleration changes slightly before the housing position will arise. Thus, the maximum and the minimum angular acceleration changes of the conventional uniform distribution setting are not 'substantially' equal.

In order to achieve the above and other objects, the present invention provides an opposed wiping type wiper unit comprising a crank arm that rotates when driven by a motor, an intermediate link pivotally supported by an intermediate link fulcrum, a connecting rod connected between the crank arm and the intermediate link so as to convert rotation of the crank arm into reciprocating oscillation of the intermediate link, the upper and lower ends of the intermediate link being respectively connected to driving levers of right-hand and left-hand wiper shafts through driving rods so as to cause opposed wiping operations of right-hand and left-hand wiper arms. The angular velocity changes of the right-hand and left-hand wiper arms are set to be asymmetrical so that the wiper blades of the right-hand and left-hand wiper arms are superposed at a lower reversal position. In this wiper unit, the length and the connecting position of the connecting rod to the intermediate link are fixedly set so that the angular acceleration change of the intermediate link is substantially symmetrical. On the other hand, the length of the driving rods and the connecting positions thereof to the intermediate link are variably set so that the angular velocity changes of the right-hand and left-hand wiper arms are asymmetrical.

This structure facilitates setting of the opposed wiping type wiper unit in accordance with both right-hand and left-hand specifications, and permits the use of as many parts common to both specifications as possible. This results in a significant decrease in the cost of producing the wiper unit because most of the same parts can be used regardless of the driver position.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

An embodiment of the present invention is described below with reference to the drawings. In the drawings, reference numeral 1R denotes an opposed wiping type wiper unit in accordance with right-hand specifications. The wiper unit 1R comprises a motor 2 integrally provided with a reduction mechanism, a crank arm 3 integrally attached to the output shaft of the motor 2 so as to rotate, an intermediate link 4 pivotally supported by intermediate ink fulcrum 4a so as to be oscillatable, a connecting rod 5 connected to the lower end of the intermediate link 4 and the tip of the crank arm 3, a right-hand wiper shaft 6a and a left-hand wiper shaft 6b disposed on the right-hand and left-hand sides of the intermediate link 4, a right-hand driving rod 8 connected between the driving lever 7a of the right-hand wiper shaft 6a and the upper end of the intermediate link 4, a left-hand driving rod 9 interposed between the driving lever 7b of the left-hand wiper shaft 6b and the lower end of the intermediate link 4, and a right-hand wiper arm 10a and a left-hand wiper arm 10b integrally attached to the right-hand and left-hand wiper shafts 6a and 6b, respectively. Namely, the rotation of the crank arm 3 when driven by the motor 2 is converted into reciprocating oscillation of the intermediate link 4 connected to the crank arm 3 with the connecting rod 5 therebetween. The upper and lower ends of the intermediate link 4 which oscillate from side to side in opposite directions are connected to the driving levers 7a and 7b of the right-hand and left-hand wiper shafts 6a and 6b through the driving rods 8 and 9, respectively, so as to cause opposite wiping operations of the wiper arms 10a and 10b attached to the r+/−right-hand and left-hand wiper shafts 6a and 6b, respectively. However, the angular velocity changes of the right-hand and left-hand wiper arms 10a and 10b are set to be asymmetrical in the vicinity of the lower reversal position, as described below, so that the wiper blades 11a and 11b are superposed without interference therebetween (the right-hand wiper blade 11a on the driver side Dr is upper, and the left-hand wiper blade 11b on the passenger side Ps is lower) at the lower reversal position.

Figure 10:
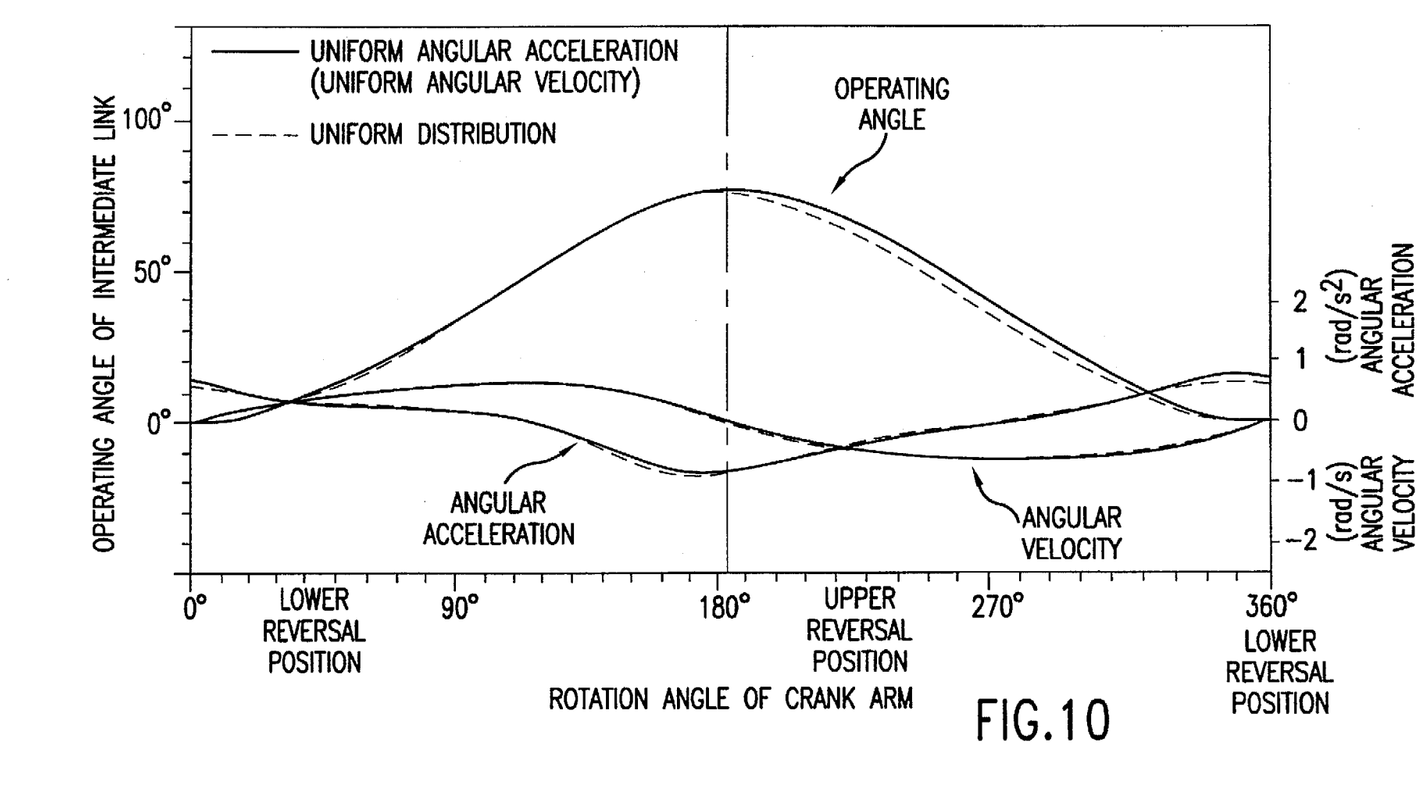
FIG. 10 is a graph showing a comparison between the present invention and a conventional example.

Reference numeral 12 denotes a driving unit comprising a motor bracket 13, the motor 2 and an intermediate link fulcrum 4a, both of which are integrally attached to the motor bracket 13. To the driving unit 12 are also attached the crank arm 3, the connecting rod 5 and the intermediate link 4. The length of the connecting rod 5 and the connecting position (the distance from the link fulcrum 4a, and the phase angle thereto) of the connecting rod 5 to the intermediate link 4 are set so that the actual angular acceleration change of the intermediate link 4 is substantially symmetrical. Namely, in the above uniform distribution setting, the angular acceleration of the intermediate link 4 is theoretically asymmetrical, as shown in FIG. 11, and the absolute values of the maximum and minimum angular acceleration changes of the intermediate link 4 in the forward and backward wiping motions are different, as shown in FIG. 9. In the present invention, therefore, the difference between the absolute values of the maximum and minimum angular acceleration changes of the intermediate link 4 in the forward and backward directions is corrected so as to be substantially equal, and the actual angular acceleration change of the intermediate link 4 is set to be substantially symmetrical (angular acceleration uniform setting). FIG. 8 is a graph showing the operation of a wiper unit in the case of the angular acceleration uniform setting. Comparison of the operating angle change shown in FIG. 8 with that shown in FIG. 9 shows that the absolute maximum values of the angular acceleration in the forward and backward wiping motions are substantially the same when the upper reversal position is shifted. FIG. 10 is a graph showing a comparison between the operations in the uniform distribution setting as shown in FIG. 9 (the broken lines in FIG. 10) and in the angular acceleration uniform setting as shown in FIG. 8.

Figure 1:
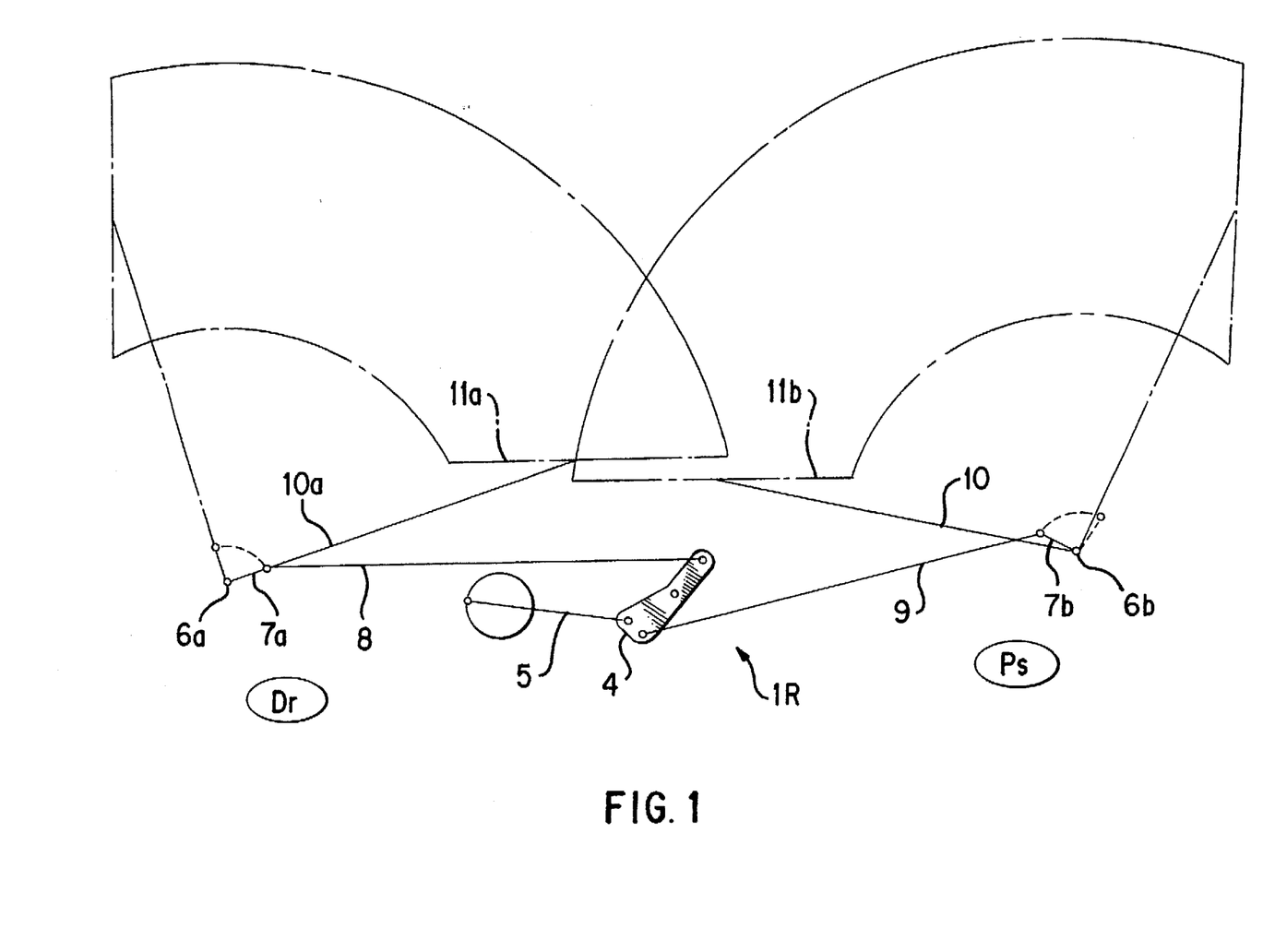
FIG. 1 is a front view illustrating the whole of an opposed wiping type wiper unit in accordance with right-hand specifications.
Figure 2:
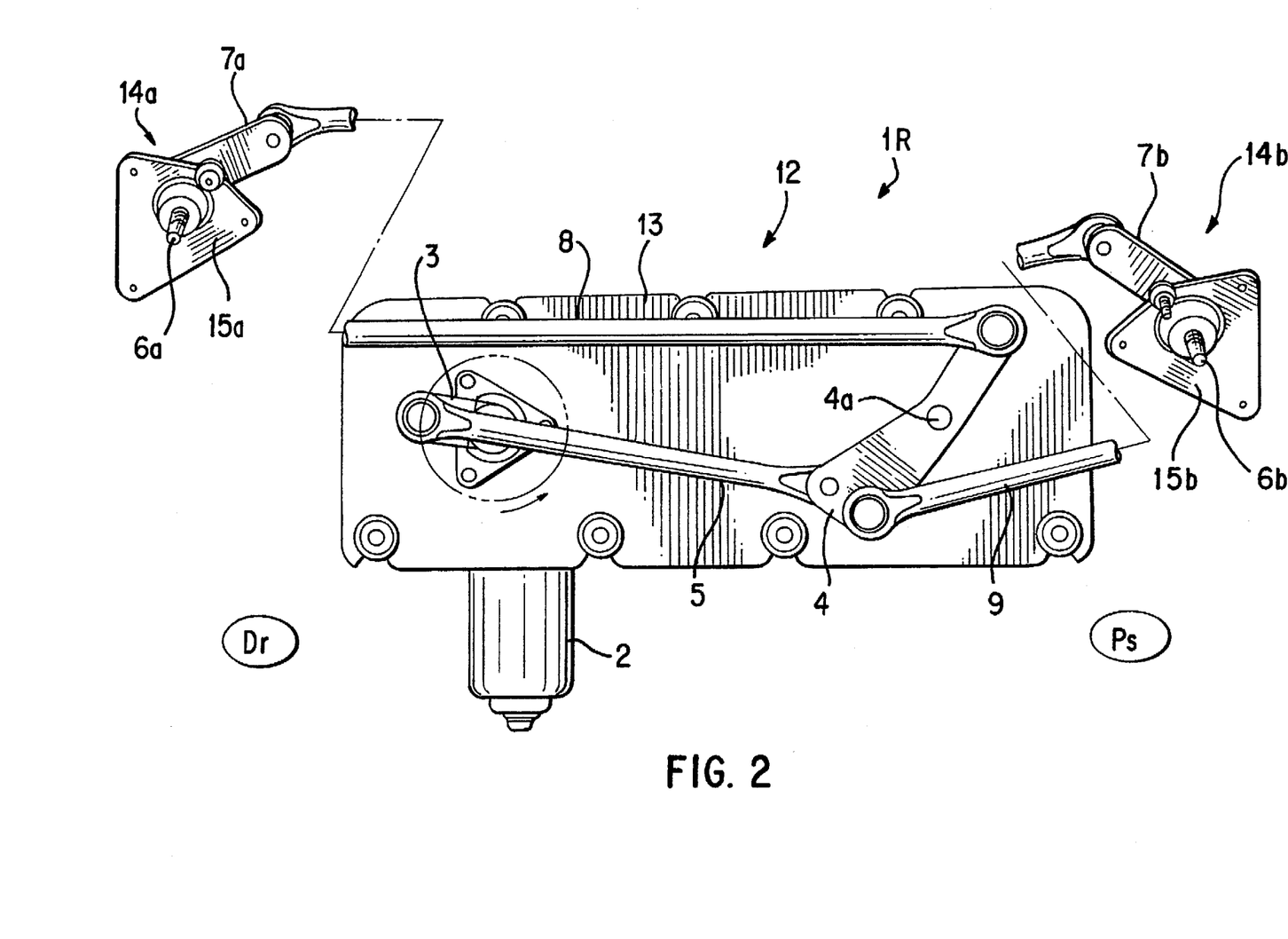
FIG. 2 is a front view illustrating the principal portion of the wiper unit of FIG. 1.

Reference numerals 14a and 14b denote right-hand and left-hand wiper shaft sleeves, respectively, each of which has the wiper shafts 6a and 6b and the driving levers 7a and 7b attached to the wiper shaft brackets 15a and 15b, respectively. The wiper shaft sleeves 14a and 14b are disposed on the right-hand and left-hand sides of the driving unit 12, as shown in FIG. 2 and are connected to the intermediate link 4 through the driving rods 8 and 9, respectively. The length of the driving rods 8 and 9 and the connecting positions (the distance from the link fulcrum 4a and the phase angle thereto) of connecting rods 8 and 9 to the intermediate link 4 are set so that the angular velocity changes of the right-hand and left-hand wiper arms 10a and 10b are asymmetrical. Namely, the angular velocity of the right-hand wiper arm 10a in the vicinity of the lower reversal position is set to be higher than that of the left-hand wiper arm 10b so that the wiper blades 11a and 11b of the right-hand and left-hand wiper arms 10a and 10b are superposed at the lower reversal position without interference therebetween. However, since the intermediate link 4 is set so that the angular acceleration changes are substantially symmetrical, as described above, the angular velocity changes of the right-hand and left-hand wiper arms 10a and 10b are set to be asymmetrical only on the basis of the set length of the driving rods 8 and 9 and the set connecting positions thereof to the intermediate link 4.

Figure 3:
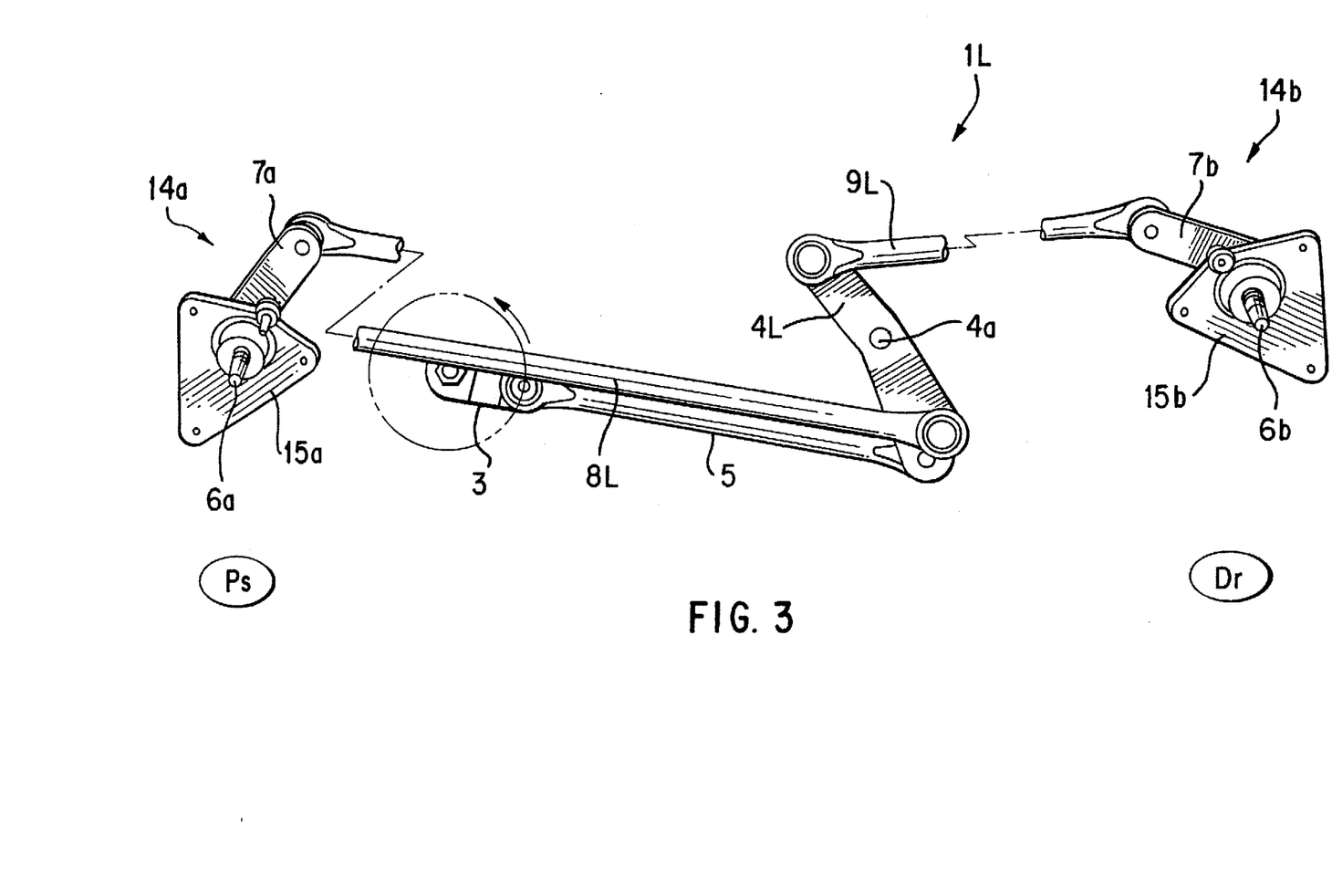
FIG. 3 is a front view illustrating the whole of opposed wiping type wiper unit in accordance with left-hand specifications.

On the other hand, reference numeral 1L denotes an opposed wiping type wiper unit in accordance with left handle specifications, as shown in FIG. 3. The wiper unit 1L is different from the wiper unit 1R in accordance with right handle specifications in the points that the positions of connection of the right-hand and left-hand driving rods 8 and 9 to the intermediate link 4 are vertically reversed, and that the positions of the right-hand and left-hand wiper arms 10a and 10b at the lower reversal position are reversed, as shown in FIG. 3. However, the motor position, the position of the intermediate link fulcrum (in this embodiment, the intermediate link is pivoted to the left from the lateral center of the unit) and the positions of the right-hand and left-hand wiper shafts are all the same as those in the wiper unit 1R. In addition, the driving unit 12, the crank arm 3, the connecting rod 5 and the wiper shaft sleeves 14a and 14b according to the right-hand specifications are also used for the left-hand specifications. Namely, the parts used for the left-hand specifications include the intermediate link 4L and the right-hand and left-hand driving rods 8L and 9L instead of the corresponding parts used for the right-hand specifications. However, since the connecting position of the connecting rod 5 to the intermediate link 4L is set so that the actual angular acceleration change of the intermediate link 4L is substantially symmetrical, i.e., set at the same position as in the right-hand specifications, the angular velocity changes of the right-hand and left-hand wiper arms 10a and 10b can be set to be asymmetrical only on the basis of the set length of the driving rods 8L and 9L and the set connecting positions thereof to the intermediate link 4L.

In the embodiment of the present invention configured as described above, since the length and the intermediate link connecting position of the connecting rod 5 for connecting the crank arm 3, which rotates with driving of the motor, and the intermediate link 4 (or 4L) which is connected to the right-hand and left-hand wiper shafts through the driving rods 8 and 9 are set so that the actual angular acceleration change of the intermediate link 4 (or 4L) are substantially symmetrical, the angular velocity changes of the right-hand and left-hand wiper arms 10a and 10b are set to be asymmetrical on the basis of the set length of the driving rods 8 and 9 and the set connecting positions thereof to the intermediate link.

In the present invention, although the angular velocity changes of the right-hand and left-hand wiper arms 10a and 10b are set to be asymmetrical so that the wiper blades 11a and 11b of the right-hand and left-hand wiper arms 10a and 10b are superposed at the lower reversal position without interference therebetween, the actual angular acceleration change of the intermediate link 4 (or 4L) is set to be substantially symmetrical. The angular velocities of the right-hand and left-hand wiper arms 10a and 10b can thus be set in accordance with righthand or left-hand specifications only by appropriately setting the driving rods 8 and 9 and the connecting positions thereof to the intermediate link 4 (or 4L) even if all factors of angular velocity changes, such as the length of the connecting rod 5, the connecting position of the connecting rod 5 to the intermediate link, the length of the driving rods 8 and 9, the connecting positions of the driving rods 8 and 9 to the intermediate link, etc. are not set to be variable. This not only facilitates setting the wiper unit according to right-hand or lefthand specifications, but also permits an attempt to significantly decrease the cost by using parts such as the crank arm 3, the connecting rod 5, the driving unit 12, the wiper shaft sleeves 14 and so on, that are common to both the right-hand and left-hand specifications.

Further, in this embodiment, because the motor position, the fulcrum position of the intermediate link and the positions of the right-hand and left-hand wiper shafts in the right-hand specifications are the same as in the left-hand specifications, the installation space for the wiper unit 1 according to each of the right-hand and left-hand specifications need not be different. Thus, not only the installation space can easily be secured but also the problems of increasing-the installation space can be avoided.

In brief, in the present invention configured as described above, the rotation of the crank arm when driven by the motor is converted into reciprocating oscillation of the intermediate link through the connecting rod, and the upper and lower ends of the intermediate link are connected to the driving levers of the right-hand and left-hand wiper shafts through the driving rods so as to bring about opposed wiping operations of the right-hand and left-hand wiper arms. However, since the length of the connecting rod and the connecting position thereof to the intermediate link are fixedly set so that the angular acceleration change of the intermediate link is substantially symmetrical, the angular velocity changes of the right-hand and left-hand wiper arms can be set to be asymmetrical only on the basis of the variable set value of the length of the driving rods and the variable set connecting positions of the driving rods to the intermediate link. This causes the wiper blades of the right-hand and left-hand wiper arms to be superposed at the lower reversal position without interference therebetween. Namely, with the present invention, when the angular velocity changes of the right-hand and left-hand wiper arms are set to be asymmetrical, unlike in a conventional example, the angular velocity can be set according to either right-hand or left-hand specifications by appropriately setting the length of the driving rods and the connecting positions thereof to the intermediate link without variably setting any other factors that effect angular velocity changes, such as the length of the connecting rod, the connecting position of the connecting rod to the intermediate link, the length of the driving rods, the connecting positions of the driving rods to the intermediate link and so on. As a result, setting according to both right-hand and left-hand specifications can be simplified significantly.

Further, in order to set the length and intermediate link connecting-positions of the driving rods according to the right-hand or left-hand specifications, it is possible to use parts such as the driving unit to which the motor and the intermediate link oscillation fulcrum are attached, the right-hand and left-hand wiper sleeves to each of which the wiper shaft and the driving lever are attached, and the crank arm, the connecting rod, etc. all of which are common to both specifications. As a result, the number of types of parts can be decreased significantly, resulting in a significant decrease in the cost of the wiper unit.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method of converting an opposed wiping type wiper unit from one of a right-hand and left-hand specification to the other of the right-hand and left-hand specification, the method comprising the steps of:

selecting a pivoting intermediate link;

connecting right-hand and left-hand driving rods to connecting positions at upper and lower ends of said intermediate link, the right-hand and left-hand driving rods each having a length;

providing an interchangeable wiper unit subassembly useable with both right-hand and left-hand specifications including:

providing said intermediate link;

providing a driving unit having a rotating crank arm; and providing a connecting rod connected between said crank arm and said intermediate link so as to convert rotation of said crank arm into reciprocating oscillation of said intermediate link; and adapting the opposed wiping type wiper unit for the one of the right-hand specification and the left-hand specification to an opposed wiping type wiper unit for the other of the right-hand specification and the left-hand specification, by only changing the lengths and connecting positions of the right-hand and left-hand driving rods.

* * * * *